United States Patent [19]

Aoyagi

[11] Patent Number: 5,420,996
[45] Date of Patent: May 30, 1995

[54] DATA PROCESSING SYSTEM HAVING SELECTIVE DATA SAVE AND ADDRESS TRANSLATION MECHANISM UTILIZING CPU IDLE PERIOD

[75] Inventor: Keizo Aoyagi, Tokyo, Japan

[73] Assignee: Kabushiki Kaisha Toshiba, Kawasaki, Japan

[21] Appl. No.: 691,087

[22] Filed: Apr. 25, 1991

[30] Foreign Application Priority Data

Apr. 27, 1990 [JP] Japan .................................. 2-110431

[51] Int. Cl.6 ............................................. G06F 12/16
[52] U.S. Cl. .................................... 395/425; 395/400; 364/DIG. 1; 364/268
[58] Field of Search ... 364/200 MS File, 900 MS File; 395/425, 575

[56] References Cited

U.S. PATENT DOCUMENTS

| | | | |
|---|---|---|---|
| 4,084,231 | 4/1978 | Capozzi et al. | 395/425 |
| 4,112,489 | 9/1978 | Wood | 395/775 |
| 4,654,819 | 3/1987 | Stiffler et al. | 395/425 |
| 4,755,928 | 7/1988 | Johnson et al. | 395/575 |
| 4,916,605 | 4/1990 | Beardsley et al. | 395/425 |
| 4,920,536 | 4/1990 | Hammond et al. | 371/10.1 |
| 4,959,774 | 9/1990 | Davis | 395/575 |
| 5,008,786 | 4/1991 | Thatte | 395/425 |
| 5,021,993 | 6/1991 | Matoba et al. | 395/775 |
| 5,060,136 | 10/1991 | Furney et al. | 395/425 |
| 5,163,148 | 11/1992 | Walls | 395/600 |
| 5,210,866 | 5/1993 | Milligan et al. | 395/575 |
| 5,235,700 | 8/1993 | Alaiwan et al. | 395/575 |
| 5,276,860 | 1/1994 | Fortier et al. | 395/575 |

*Primary Examiner*—Rebecca L. Rudolph
*Assistant Examiner*—Matthew Kim
*Attorney, Agent, or Firm*—Oblon, Spivak, McClelland, Maier & Neustadt

[57] ABSTRACT

A main memory has a plurality of divided storage areas. A central processing unit saves data from each storage area of the main memory into an auxiliary memory during a normal operation of a computer system, and sets a flag corresponding to each storage area, from which the data is saved, in a state indicating the end of a save operation. In addition, when data stored in the main memory is updated, the central processing unit changes the flag into a state indicating an incomplete save state. When the computer system must be stopped, the central processing unit saves data, of the data stored in the main memory, only from a storage area for which the flag indicates an incomplete save state into the auxiliary memory, thereby shortening the time required for save processing.

13 Claims, 7 Drawing Sheets

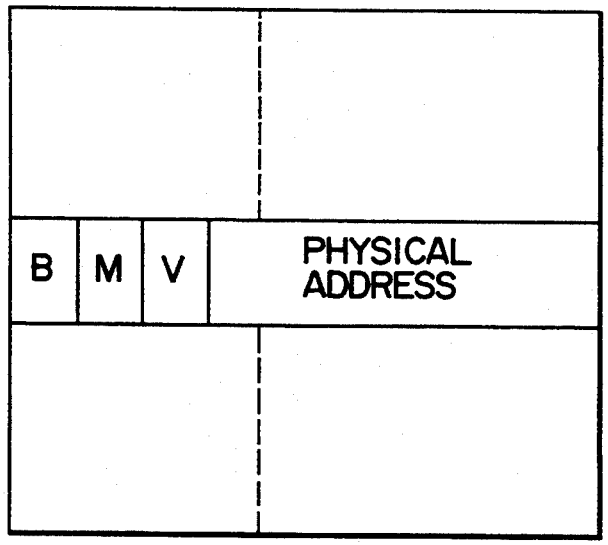
B: SAVE END FLAG
M: PAGE OPERATION FLAG
V: PAGE VALID FLAG
F I G. 3
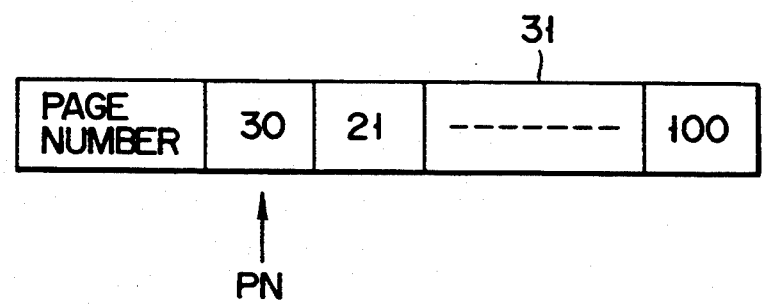
F I G. 9

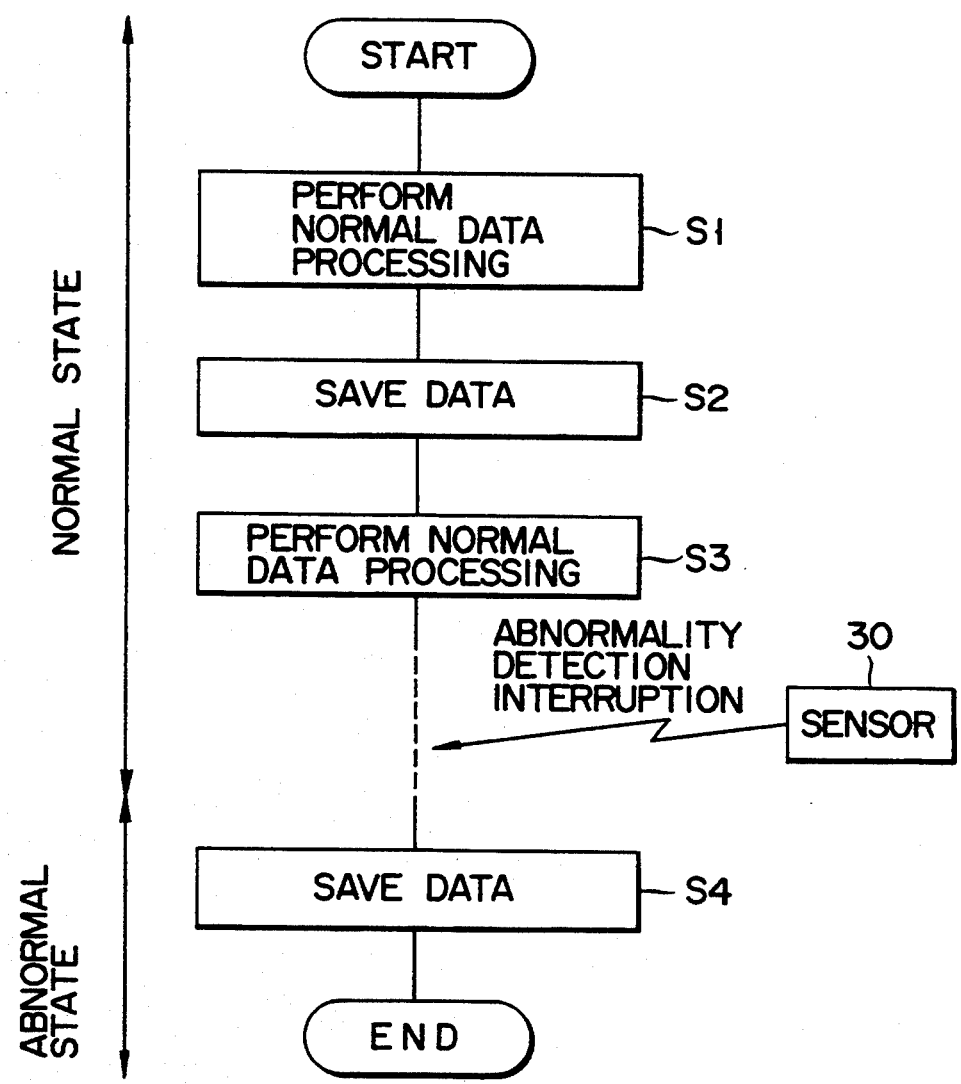
F I G. 4

DATA PROCESSING SYSTEM HAVING SELECTIVE DATA SAVE AND ADDRESS TRANSLATION MECHANISM UTILIZING CPU IDLE PERIOD

BACKGROUND OF THE INVENTION

1. Field of the Invention

The present invention relates to a data processing system and a data processing method and, more particularly, to an improvement in an apparatus and method of saving data from a main memory into an auxiliary memory.

2. Description of the Related Art

When a fault occurs in a computer system, and the system is unavoidably stopped, the contents of a main memory at the time of the stoppage of the system are useful for analysis of the fault. For this reason, in a conventional system, the contents of a main memory at the time of the stoppage of the system are saved in an auxiliary memory.

In conventional systems, the contents of a main memory can be saved in an auxiliary memory within a relatively short period of time. For example, if the storage capacity of a main memory is 5 Mbytes, and a data transfer speed is 5 Mbyte/sec, the contents of the main memory can be saved in an auxiliary memory within almost one second.

With the progress of the semiconductor technology, the storage capacity of a main memory has been greatly increased. However, there is not much increase in speed of data transfer between a main memory and an auxiliary memory with the present data save techniques, therefore, it may require a long period of time to save the contents of a main memory in an auxiliary memory in the future. Assume that a computer system has a G (giga)-byte-level main memory, and the speed of data transfer to an auxiliary memory is not much increased. In this case, it takes a very long period of time, i.e., several tens minutes to one hour, to save the contents of the main memory. It is not preferable to take such a long period of time to save data. Furthermore, in general, a computer system is rarely allowed to stop for a long period of time. The computer system is normally required to be restarted immediately after the stoppage. However, the system cannot be immediately restarted if it takes a long period of time to save data.

SUMMARY OF THE INVENTION

The present invention has been made in consideration of the above situation, and has as its object to provide a data processing apparatus and a data processing method which can save the contents of a main memory in an auxiliary memory within a short period of time.

In order to achieve the above object, according to the present invention, there is provided a data processing system having a main memory for storing data in units of blocks a first data save unit for saving the data stored in the main memory into an auxiliary memory during an idle time (e.g., a wait time) of the data processing system is provided. A second data save unit for extracting blocks of data, of the data stored in the main memory, which are not saved by the first save unit and are updated after the save operation is performed by the first save unit is provided, and saving the extracted blocks of data in the auxiliary memory, when stoppage of the data processing system is designated.

With the above-described arrangement, according to the present invention, only blocks, of the blocks of the main memory, which are required to be saved in the auxiliary memory are substantially saved. Therefore, when the stoppage of the data processing system is designated, the time required for save processing can be shortened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a view showing an address transformation table;

FIG. 4 is a flow chart showing a general operation of the computer system;

FIG. 9 is a view showing a table in another embodiment of the present invention,

DETAILED DESCRIPTION OF THE PREFERRED EMBODIMENTS

Figure 1:
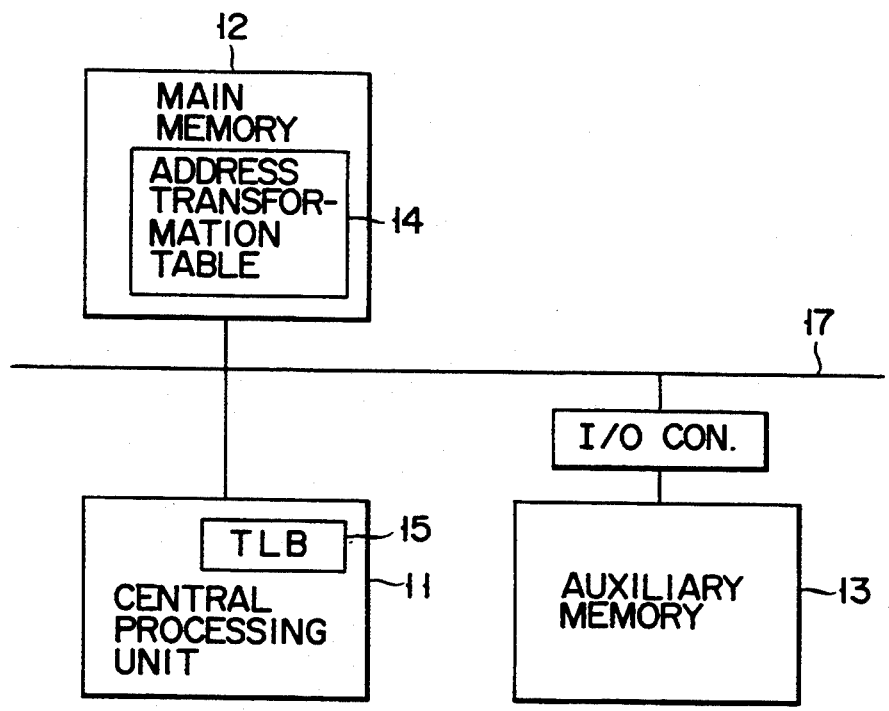
FIG. 1 is a block diagram showing a computer system according to an embodiment of the present invention.

A data processing system and method of a virtual memory scheme according to an embodiment of the present invention will be described below with reference to the accompanying drawings, FIG. 1 shows an arrangement of a computer system using a data save scheme of this embodiment. Referring to FIG. 1, a central processing unit (CPU) 11 performs data processing and various types of control operations in accordance with an OS (operating system) stored in a main memory 12 constituted by, e.g., a RAM or a ROM.

The CPU 11 includes a TLB (translation lookaside buffer) 15 for performing address conversion at high speed.

The main memory 12 is connected to the central processing unit 11 through a bus 17 and stores various types of processing data in units of pages in addition to programs. The main memory 12 includes an address transformation table 14 for converting a virtual address into a physical address, a page number memory PN for storing the number of a page to be processed, and the like.

An auxiliary memory 13 is connected to the bus 17 through an input/output controller (I/O controller) 16. The I/O controller 16 has its own CPU and controls the exchange of data between the main memory 12 and the auxiliary memory 13 in response to a command from the central processing unit 11. The auxiliary memory 13 is constituted by a RAM (a semiconductor memory), a magnetic disk unit, a floppy disk unit, or an optical disk unit and is used as a memory or the like for saving data stored in the main memory 12.

Figure 2:
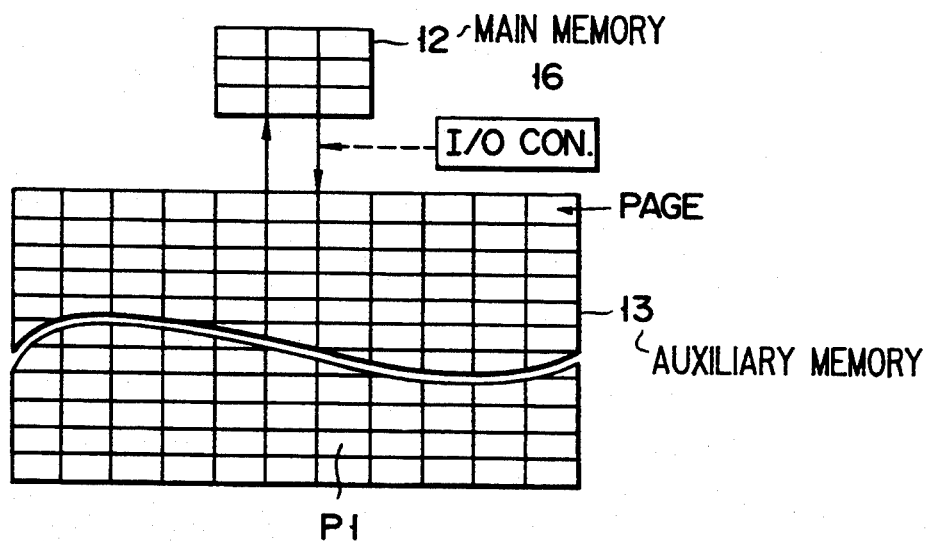
FIG. 2 is a view showing data formats of main and auxiliary memories.

FIG. 2 schematically shows storage structures of the main and auxiliary memories 12 and 13 shown in FIG. 1. Referring to FIG. 2, each block in the main and auxiliary memories 12 and 13 represents a page as a data unit (generally consisting of 256 bytes to 4 Kbytes). The size of an address space which can be used by the central processing unit 11 determines the number of pages which can be stored in the auxiliary memory 13.

FIG. 3 shows a structure of the address transformation table 14 in FIG. 1.

The address transformation table 14 includes entries corresponding to the respective pages on the address space. Each entry has areas for respectively storing a physical address, a page valid flag v, a page operation flag M, and a save end flag B. The page valid flag V indicates whether a corresponding page exists in the main memory 12. A physical address is set in the entry in which the page valid flag v is set, and designates the physical start address of a storage area, in the main memory 12, in which the data of the corresponding page is stored. The page operation flag M indicates whether the data of the corresponding page is changed (updated). The save end flag B indicates whether the data of the corresponding page is saved in the auxiliary memory 13.

If access to a given virtual address is made, and a page corresponding to this virtual address is formed in the main memory 12 upon, e.g., data transfer from the auxiliary memory 13 to the main memory 12, the valid flag V corresponding to the page is set. Meanwhile, the page operation flag M and the save end flag B are turned off. If the contents of a given page in the main memory are deleted, the page valid flag v corresponding to the page is reset.

If the data of a given page in the main memory 12 is updated, the page operation flag M corresponding to the page is set. If the contents of a given page in the main memory 12 are deleted, the page operation flag M corresponding to the page is reset.

The save end flag B corresponding to a page which is not saved in the auxiliary memory 13 is reset. If saving of the data of a given page into the auxiliary memory 13 is completed, the save end flag B corresponding to the page is set.

If the data of a given page in the main memory 12 is updated, the operation flag M corresponding to the page is set, and at the same time, the save end flag B is reset. If the data of a page for which the save end flag B is set is updated, the save end flag B is reset regardless of the state of the corresponding page operation flag M.

The TLB 15 is designed to convert a virtual address into a physical address at high speed and is constituted by a high-speed memory. The TLB 15 stores a copy of data (flags V, M, and B and physical addresses) stored in the address transformation table 14 in correspondence with some of the virtual addresses.

An operation of the computer system having the above-described arrangement will be briefly described below with reference to a flow chart in FIG. 4.

In normal data processing, the central processing unit 11 performs various types of operations such as an arithmetic operation, a control operation, and an input/output operation. When the storage contents of the main memory 12 are operated in accordance with such various types of operations, the address transformation table 14 stores information associated with the operations for the storage contents of the main memory 12 in units of pages (step S1).

If the computer system is set in a standby (idle) state during data processing, the central processing unit 11 saves data from the main memory 12 into the auxiliary memory 13 in units of pages by itself or by controlling the I/O controller 16 (step S2).

If a request is generated by the system, the central processing unit 11 shifts to normal data processing even in the process of a saving operation, thus preventing adverse effects on normal data processing (step S3). Subsequently, normal data processing similar to the processing in step S1 is repeated.

If a sensor 30 (FIG. 4) or the like detects an abnormality of the system and outputs an abnormality detection interrupt signal or the like, the central processing unit 11 saves data from the main memory 12 into the auxiliary memory 13 by itself or by controlling the I/O controller 6 in response to the interrupt signal. In this case, the central processing unit 11 extracts and saves the data of pages which are not saved in the wait state in step S2, and the data of pages including data updated after step S2 (step S4). This operation is equivalent to saving of the entire contents of the main memory 12 into the auxiliary memory 13. Moreover, the time required for data saving is shorter than that required in a conventional system.

The operation shown in FIG. 4 will be described in more detail below with reference to FIGS. 5 to 8.

Figure 5:
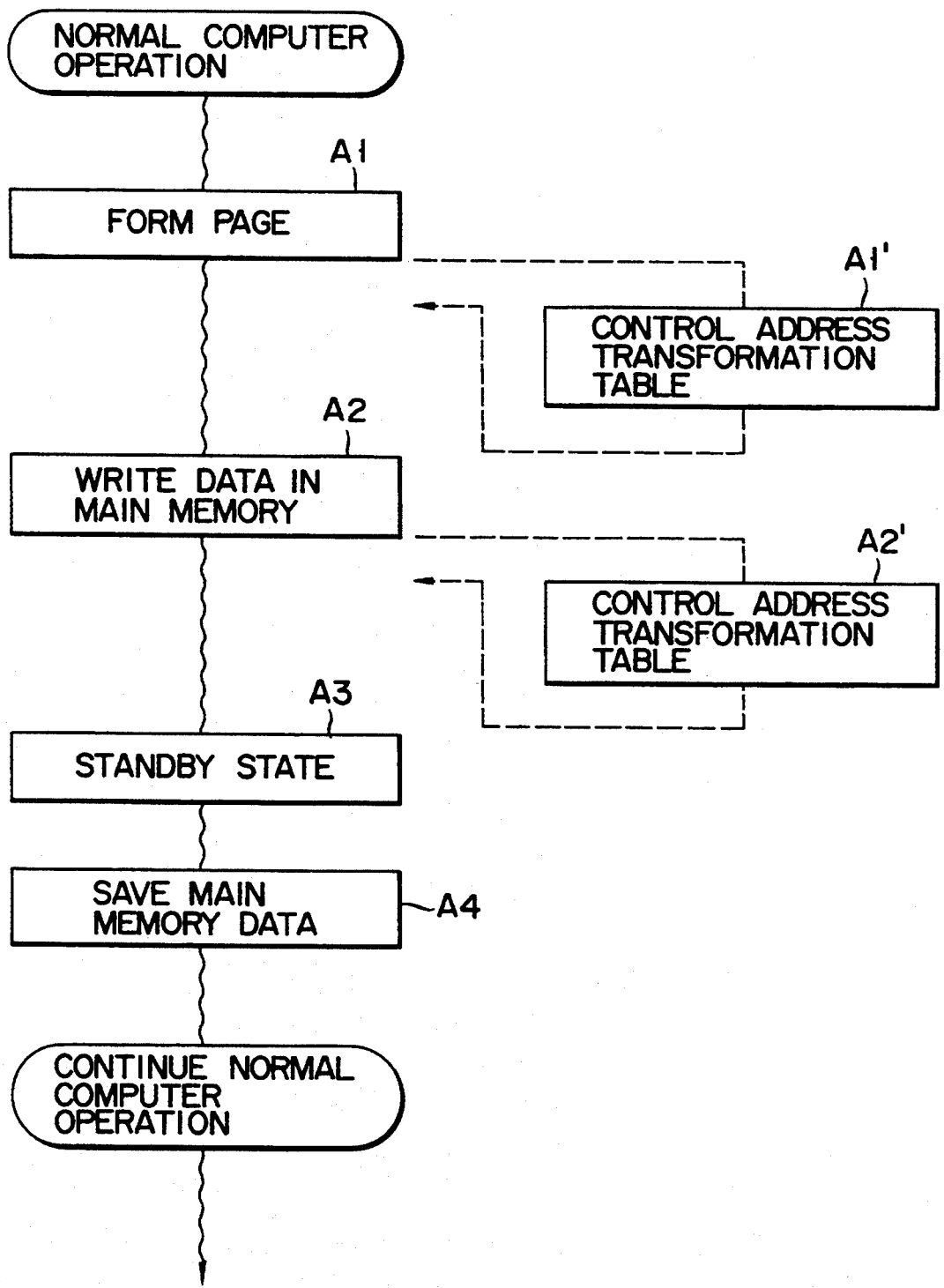
FIG. 5 is a flow chart showing a normal operation of the computer system.

FIG. 5 shows a procedure of normal data processing of the computer system according to this embodiment. In order to facilitate understanding of the present invention, the flow chart in FIG. 5 indicates only portions associated with this embodiment.

Assume that the central processing unit 11 designates a read operation of the data of a page P1 (shown in FIG. 2), which does not exist in the main memory 12, in step A1. The central processing unit 11 detects the absence of the data of the page P1 in the main memory 12 on the basis of the page valid flag v stored in the address transformation table 14 or the TLB 15. The central processing unit 11 then supplies a command to the I/O controller 16 to perform data transfer from the auxiliary memory 13 to the main memory 12 together with parameters such as a virtual address representing the page P1, a destination address, and a transfer data amount. In response to the command, the I/O controller 16 transfers the data of the page P1 from the auxiliary memory 13 to the main memory 12. Upon completion of the transfer operation, the I/O controller 16 supplies an interrupt signal representing the end of transfer operation to the central processing unit 11. The central processing unit 11 or the I/O controller 16 performs address transformation table control (step A1'). That is, it sets the valid flag v and a physical address in an entry corresponding to the page P1, while resetting the page operation flag M and the save end flag B.

Assume that write processing with respect to the main memory 12 is required in the process of a normal computer operation. Such processing is required, for example, when the central processing unit 11 performs a predetermined arithmetic operation, and the resultant data is written in the main memory unit 12. In this case, the central processing unit 11 accesses the TLB 15. If a TLB hit is made, the central processing unit 11 obtains a physical address corresponding to the virtual address (page number). If no TLB hit is made, the central processing unit 11 transfers the corresponding data from the address transformation table 14 to the central processing unit 11, and accesses the TLB 15 again to obtain a physical address. The central processing unit 11 writes the data at a position designated by an intrapage address, of a storage area, having the obtained physical address as a start address.

When the data is written in a given page area in the main memory 12, i.e., the data of a given page is operated on, a software interrupt occurs in the central processing unit 11, and interrupt processing for address transformation control is executed (step A2').

Figure 6:
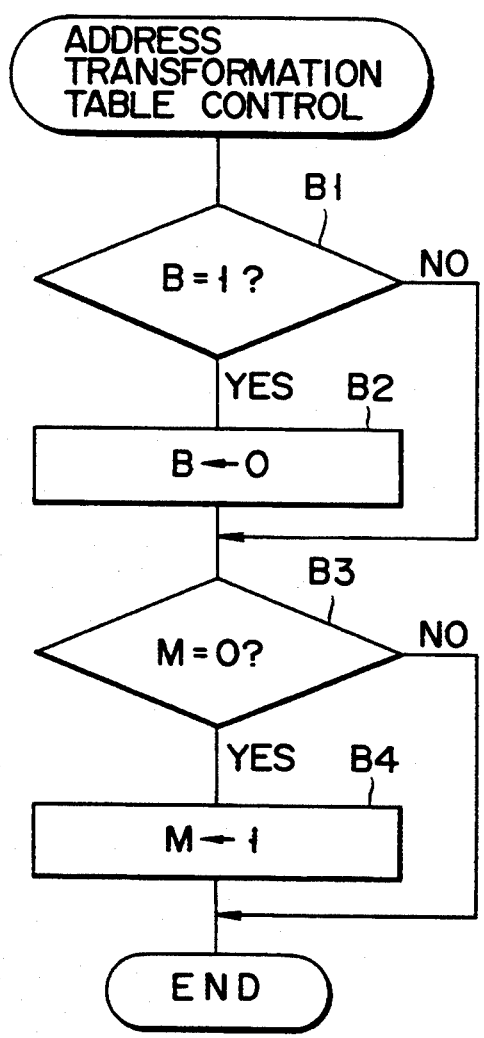
FIG. 6 is a flow chart showing processing for controlling an address transformation table.

The address transformation table control processing in step A2' will be described in detail below with reference to FIG. 6.

If data is written in a given page area in the main memory 12 in step A2, it is checked from the contents of the TLB 15 whether the save end flag B corresponding to the page in which the data is written is at "1" (step B1). If B="1", the save end flag B is reset (B←0) to set the page to a save target page (to be saved in the auxiliary memory 13 when an abnormality occurs in the computer system) (step B2). If B="0", the flow skips step B2. Thereafter, it is checked whether the page operation flag M is at "0" (step B3). If M="0", since the corresponding page is operated in step A2, the page operation flag M is set (M←1) (step B4).

The flow returns to the main routine in FIG. 5 to continue the normal operation. Subsequently, similar operations are repeated.

Referring to the flow chart in FIG. 5, if the normal computer operation is completed or interrupted, and the central processing unit 11 is set in a wait state (step A3), a software interrupt occurs in the unit 11, and the unit 11 starts main memory data save processing (step A4). A wait state can be detected by checking a wait state flag of a program status word PSW.

In order to perform save processing, the central processing unit 11 supplies a command to the I/O controller 16 to save data from the main memory 12 into the auxiliary memory 13. In response to this command, the I/O controller 16 starts the processing shown in FIG. 7.

The I/O controller 16 accesses the address transformation table 14 to check whether the data of a page designated by the page number memory PN is stored in the main memory 12, i.e., V="1" (step C0). In this case, the TLB 15 is not used. If V="1", the flow advances to step C1 to access the address transformation table 14 to check whether the save end flag B corresponding to the page designated by the page number memory PN is at "1", i.e., whether saving of the data of the page is completed. In this case, the TLB 15 is not used.

If it is determined in step C0 that V="0", or if it is determined in step C1 that B="1", the count of the page number memory PN is incremented by one to check the next page (step C2). The updated page number is compared with the last page number (step C3). If it is determined in step C3 that the updated page number exceeds the last page number, the flow advances to step C4. In step C4, the page number memory PN is initialized, and the flow returns to the main routine. If it is determined in step C3 that the updated page number does not exceed the last page number, the flow returns to step C0 to perform processing for the next page.

If it is determined in step C1 that the data save end flag B is "0", it means that the data of the page designated by the page number memory PN is not completely saved in the auxiliary memory 13. Therefore, the I/O controller 16 saves the data of the page in the auxiliary memory 13 (step C5). A procedure of processing in step C5 will be described in detail below. The I/O controller 16 accesses the address transformation table 14 to obtain the physical address of the storage area in which the data of the page is stored. The I/O controller 16 transfers a predetermined amount of data to the auxiliary memory 13 by using the obtained physical address as a start address (step C5). In this case, the save end flag B, in the address transformation table 14, corresponding to the page is set at "1" (save end state). If the data associated with the page is present in the TLB 15, the save end flag B corresponding to the page is also set at "1". If, however, the data associated with the page is not present in the TLB 15, the contents of the TLB 15 are not operated.

When transfer of one-page data is completed, the count of the page number memory PN is incremented by one to increase the page number as a transfer target (step C6). The updated page number is compared with the last page number (step C7). If it is determined that the updated page number exceeds the last page number, the page number memory PN is initialized (step C4). If it is determined in step C7 that the updated page number does not exceed the last page number, the flow returns to step C0 to perform processing for the next page.

Figure 7:
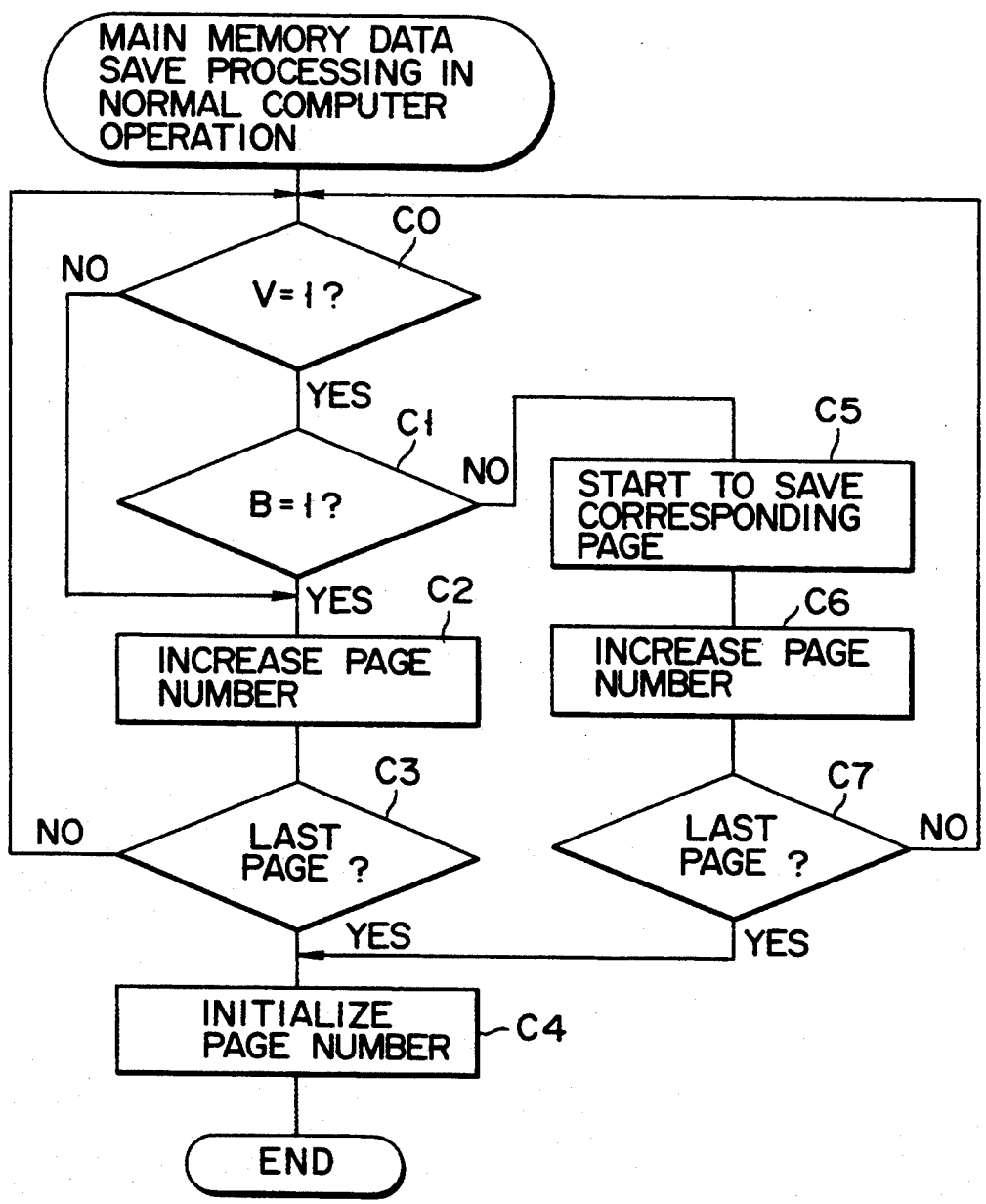
FIG. 7 is a flow chart showing main memory data save processing in a normal operation.

When a normal computer operation is started, and the central processing unit 11 is released from the wait state, a software interrupt occurs in the unit 11. With this interruption, the data save processing shown in FIG. 7 is brought to an end even if the processing is not yet completed. Subsequently, normal data processing is continued.

Assume that a power failure, a voltage error, a hardware failure, or the like occurs during normal data processing. In this case, an interrupt signal representing the occurrence of such an abnormality is supplied to the central processing unit 11. In accordance with the type of interrupt signal, the central processing unit 11 determines whether the operation must be stopped. When the system is to be stopped, the contents of the main memory 12 are saved in the auxiliary memory 13 to allow abnormality analysis, retention of data, restart, and the like.

This save operation will be described below with reference to a flow chart in FIG. 8. When some kind of abnormality occurs in the computer system, and its system operating must be stopped, the central processing unit 11 supplies a command to the I/O controller 16 to perform a data save operation at the time of the stoppage of the system. In response to this command, the I/O controller 16 initializes the page number memory PN, i.e., the page number of a save target (step D1).

Subsequently, the I/O controller 16 accesses the address transformation table 14 to check whether the page valid flag v corresponding to the page designated by the page number memory PN is at "1", i.e., the data of the page is present in the main memory 12 (step D0). If V="1", the I/O controller 16 accesses the address transformation table 14 to check whether the page save end flag B corresponding to the page designated by the page number memory PN is at "0" (step D2). If it is determined in step D2 that B="0", i.e., saving of the data of the page is not completed, the I/O controller 16 transfers the data of the corresponding page to the auxiliary memory 13 (step D3).

A procedure of processing in step D3 will be described in detail below. The I/O controller 16 accesses the address transformation table 14 to obtain the physical address of a storage area in which the data of the page is stored. The I/O controller 16 transfers a predetermined amount of data to the auxiliary memory 13 by using the obtained physical address as a start address (step C5). When one-page data is completely transferred, the I/O controller 16 sets the save end flag B, of the address transformation table 14, corresponding to the page to "1" (save end state). If the data associated with the corresponding page is present in the TLB 15, the I/O controller 16 also sets the save end flag B corresponding to the page to "1". If, however, the data associated with the page is not present in the TLB 15, the contents of the TLB 15 are not operated. This process for the address transformation table 14 can be omitted because this information is lost when this computer system is stopped. By omitting this process, the time period required for data saving is shortened.

After saving the one-page data is completed, the count of the page number memory PN is incremented by one (step D4). The updated page number is compared with the last page number (step D5). If the updated page number does not exceed the last page number, the flow returns to step D0. Subsequently, data save processing is executed in accordance with the values of the flags v and B until the page number designated by the page number memory PN exceeds the last page number.

If it is determined in step D0 that V="0", or if it is determined in step D2 that B="1", the flow skips step D3. Since no data save operation is performed in this case, the total time period required for the data transfer speed is shortened.

When save processing for all the pages is completed, the computer system is stopped.

According to the above-described computer system, the save end flags B, each representing whether saving of the data of a corresponding page is completed, are set in units of pages of the main memory 12. In a wait state of the central processing unit 11 during a normal computer operation, data save processing is executed in advance while the save end flags B are set. With this operation, when, for example, the computer system is to be stopped upon occurrence of an abnormality, only the data of pages for which the save end flags B are reset are required to be saved. Therefore, when the computer system is to be stopped, all the data in the main memory 12 need not be transferred to the auxiliary memory 13 at once, and substantially all the data in the main memory 12 can be saved within a short period of time.

Furthermore, in this embodiment, when the data of a given page, of the main memory 12, which has been saved in a wait state, is to be updated, the data save flag B corresponding to the page is reset to indicate a data save incomplete state. With this operation, when the final data save processing is completed, the main memory data can be properly and completely retained.

In this embodiment, since the TLB 15 is used in normal data processing, a virtual address can be converted into a physical address at high speed. In contrast to this, in a save operation, the address transformation table 14 is used in place of the TLB 15 to check the flag B and perform address conversion. There are two reasons why such a technique is employed.

The first reason is based on the fact that a save operation is not a normal computer system operation. If the TLB 15 is used in a save operation to rewrite the contents of the TLB 15, a TLB hit ratio is decreased in a normal operation to lower the processing speed. In order to avoid such a situation, the address transformation table 14 is mainly used in a data save operation in place of the TLB 15.

The second reason is based on the fact that since the count of the page number memory PN is sequentially updated, if the TLB 15 is used, the TLB hit ratio is decreased. Therefore, if the TLB 15 is used, the operation speed may be decreased as compared with a case wherein the TLB 15 is not used.

In the above-described embodiment, the page number memory PN is arranged, and the count of the page number memory PN is sequentially updated to check whether saving is completed for all the pages in the virtual memory space. However, such an operation can be more efficiently performed by checking whether the data of only the pages stored in the main memory 12 are completed.

Two examples based on this technique will be described below.

In the first example, the page number memory PN stores a physical address of the main memory 12. In response to a data transfer command from the central processing unit 11, the I/O controller 16 generates the relative address of the start position of each page on the basis of the start address, as a reference address, of the page data storage area of the main memory 12. If, for example, a page consists of 256 bytes, the I/O controller 16 updates the count of the page number memory PN to 0, 255, 511, . . . The I/O controller 16 obtains a physical address by adding the reference address and the relative address. On the basis of the obtained physical address, the I/O controller 16 obtains the value of the flag B corresponding to the physical address from the address transformation table 14, and transfers the data of the page corresponding to B="0".

In the second example, the main memory 12 further includes a table 31 shown in FIG. 9, which is designed to store page numbers stored in the main memory 12. When the central processing unit 11 stores the data of a new page in the main memory 12, it stores the corresponding page number in the table 31. If the central processing unit 11 deletes the data of a page in the main memory 12, it deletes the corresponding page number from the table 31. The page number memory PN stores the address of an entry of the table 31. In response to a data transfer command from the central processing unit 11, the I/O controller 16 initializes the page number memory PN, extracts the page number (30 in FIG. 9) of the start entry of the table 31, obtains the value of the flag B corresponding to the page number, and transfers the data of the page corresponding to B="0" to the auxiliary memory 13. Subsequently, the I/O controller 16 updates the count of the page number PN to update the entry of the table 31. The abovedescribed operation is repeated until the count of the page number memory PN exceeds the maximum entry number of the table 31.

The present invention is not limited to the embodiment described above.

In the above embodiment, for example, the end of data transfer or the presence/absence of a data rewrite operation is checked in units of pages. However, another type of data block such as a segment may be used as a unit.

In the above embodiment, when NO is obtained in step C3 or C7 in FIG. 7, the flow returns to step C0. However, the flow may be brought to an end. In this case, if the central processing unit 11 is still in a wait state at the end of the flow, the save processing shown in FIG. 7 is performed again. In addition, the central processing unit 11 may update the count of the page number memory PN and check whether the data of the page designated by the page number memory PN is stored in the main memory 12 so that only when the central processing unit 11 determines that the data of the page designated by the page number memory PN is present in the main memory 12, a data save command is supplied to the I/O controller 16.

Figure 8:
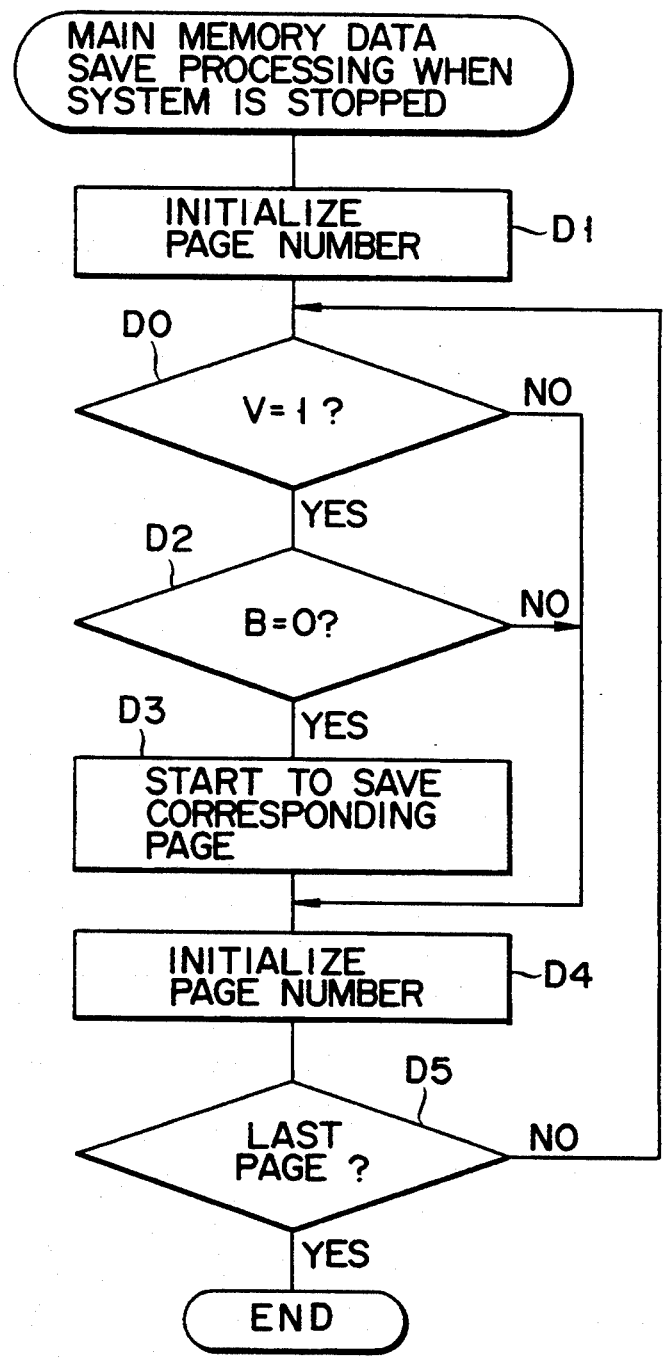
FIG. 8 is a flow chart showing main memory data save processing at the time of the stoppage of the computer system.

According to the flow charts in FIGS. 7 and 8, the contents of the flag V is checked in step C0 and D0 to determine whether the data of a corresponding page is present in the main memory 12. However, the save end flag B=0 may be set when a given page is formed in the main memory 12, while the save flag B=1 may be set when the page is deleted from the main memory 12, thus determining whether the page is saved, without checking the page valid flag v. In this case, steps C0 and D0 are omitted from the flow charts in FIGS. 7 and 8.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data processing system comprising:
   a main memory having a plurality of divided storage areas;
   an auxiliary memory in which contents of said main memory are saved;
   first save means, connected to said main memory and said auxiliary memory, and including means for saving data from each storage area of said main memory into said auxiliary memory during a normal operation of said data processing system, and means for setting save end information for storage areas, from which data is saved into said auxiliary memory, said first save means including a CPU for controlling said first save means during an idle state of the CPU;
   update means, connected to said main memory, for, when data in said main memory is updated, resetting the save end information for the storage areas in which the updated data is stored; and
   second save means, connected to said main memory and said auxiliary memory, for saving data in the storage areas for which the save end information is reset when said data processing system must be stopped.

2. The data processing system according to claim 1, wherein said first save means comprises means, connected to said main memory, for discriminating the storage areas for which the save end information is reset and means, connected to said main memory and auxiliary memory, for selectively saving data from storage areas discriminated by said discriminating means, into said auxiliary memory.

3. The data processing system according to claim 1, wherein said second save means comprises means for discriminating the storage areas for which the save end information is reset, and means, connected to said main memory, for selectively saving data from storage areas discriminated by said discriminating means, into said auxiliary memory.

4. The data system system according to claim 1, further comprising data write means for writing data in said main memory, and
   wherein said update means includes means, connected to said main memory, for resetting the save end information for a storage area in which data is updated.

5. The data processing system according to claim 1, further comprising an address transformation table for converting a virtual address into a physical address, and wherein the
   save end information is stored in said address transformation table, and said second save means checks said save end information based on contents of said address transformation table.

6. The data processing system according to claim 1, wherein said main memory comprises a table for storing the save end information for each storage area of said main memory.

7. The data processing system according to claim 1, wherein said first save means performs the save operation when a program status word indicates that the system is in the idle waiting state during performing a program.

8. A data processing system comprising:
   a main memory having a plurality of divided storage areas;
   an auxiliary memory in which contents of said main memory are saved;
   first save means, connected to said main memory and said auxiliary memory, and including means for saving data from each storage area of said main memory into said auxiliary memory during a normal operation of said data processing system, and means for setting save end information for storage areas, from which data is saved into said auxiliary memory;
   update means, connected to said main memory, for, when data in said main memory is updated, resetting the save end information for the storage areas in which the updated data is stored;
   second save means, connected to said main memory and said auxiliary memory, for saving data in the storage areas for which the save end information is reset when said data processing system must be stopped; and
   wherein said first save means performs the save operation when a program status word indicates that the system is in a waiting state during performing a program.

9. A computer comprising;
   a main memory means for storing data in units of data blocks,
   an auxiliary memory;
   first save means, connected to said main memory means and said auxiliary memory, for saving the data stored in said main memory means into said auxiliary memory in units of data blocks during a normal operation of said computer, said first save means including a CPU for controlling said first save means during an idle state of the CPU; and second save means, connected to said main memory means and said auxiliary memory, and including means for detecting data blocks, of the data stored in said main memory means, which are not saved by said first save means, and data blocks including data which is updated after the data save operation is performed by said first save means, and means for saving the detected data blocks in said auxiliary memory, when stoppage of said computer is designated.

10. The computer according to claim 9, further comprising save information storage means for storing information indicating whether each data block stored in said main memory means is saved in said auxiliary memory, and wherein said first save means causes said save information storage means to store data indicating that the data block is saved when a given data block is saved in said auxiliary memory, and said second save means extracts data blocks, which are not saved, based on the data stored in said save information storage means.

11. The computer according to claim 9, further comprising save information storage means for storing save information indicating whether each data block stored in said main memory means is saved in said auxiliary memory, and means for, when data stored in said main memory is updated, updating save information of a data block, to which the updated data belongs, to indicate that the data block is not saved, and wherein said second save means extracts a data block on the basis of data stored in said save information storage means.

12. A computer system for saving data stored in a main memory into an auxiliary memory when said computer system must be stopped, wherein said computer system includes means for saving the data stored in said main memory means into said auxiliary memory during an operation time of said system and including a CPU for controlling the saving when the CPU is in an idle state, and means for saving data, of the data stored in said main memory means, which are not saved and updated after a save operation, when said computer system must be stopped.

13. The computer system according to claim 12, wherein said computer system manages the data in units of blocks.

* * * * *